(12) United States Patent  (10) Patent No.: US 8,357,853 B1
Gretz  (45) Date of Patent: Jan. 22, 2013

(54) RAPID MOUNT ELECTRICAL CABLE ENTRY DEVICE WITH FLEXIBLE SLOTTED INSERT

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 13/068,343

(22) Filed: May 9, 2011

Related U.S. Application Data

(63) Continuation-in-part of application No. 13/066,893, filed on Apr. 27, 2011, now Pat. No. 8,314,350, and a continuation-in-part of application No. 12/319,648, filed on Jan. 9, 2009, now Pat. No. 8,063,302.

(51) Int. Cl.
*H02G 3/10* (2006.01)
(52) U.S. Cl. ............. 174/67; 29/755; 174/480; 220/242
(58) Field of Classification Search ............. 29/755; 174/66, 67; 220/242
See application file for complete search history.

(56) References Cited

U.S. PATENT DOCUMENTS

| | | | |
|---|---|---|---|
| 4,688,747 A | 8/1987 | Helmsdorfer et al. | |
| 6,102,360 A | 8/2000 | Clegg et al. | |
| 6,346,674 B1 * | 2/2002 | Gretz | 174/58 |
| 6,462,277 B1 | 10/2002 | Young et al. | |
| 6,508,445 B1 | 1/2003 | Rohmer | |
| 7,495,171 B2 | 2/2009 | Gorin et al. | |
| 2008/0115955 A1 * | 5/2008 | Gorin et al. | 174/66 |

* cited by examiner

*Primary Examiner* — Livius R Cazan

(57) ABSTRACT

A rapid mount electrical cable entry device including a rigid low voltage frame and a flexible slotted insert for routing low voltage cables through walls. The low voltage frame includes a plate with an opening therein defining an inner periphery on the plate at the opening. The low voltage frame includes mounting fasteners with attached clamp arms for securing the frame to a wall. The slotted insert includes a flexible panel with a hole therein and a plurality of open slots extending radially from the hole. The slots enable the cable entry device to accommodate passage of low voltage cables there. The slots define flaps that close around the cables after they are inserted therein, thus closing the area around the periphery of the inserted cables. Wall preparation requires only a hole saw, which minimizes installation time.

17 Claims, 8 Drawing Sheets

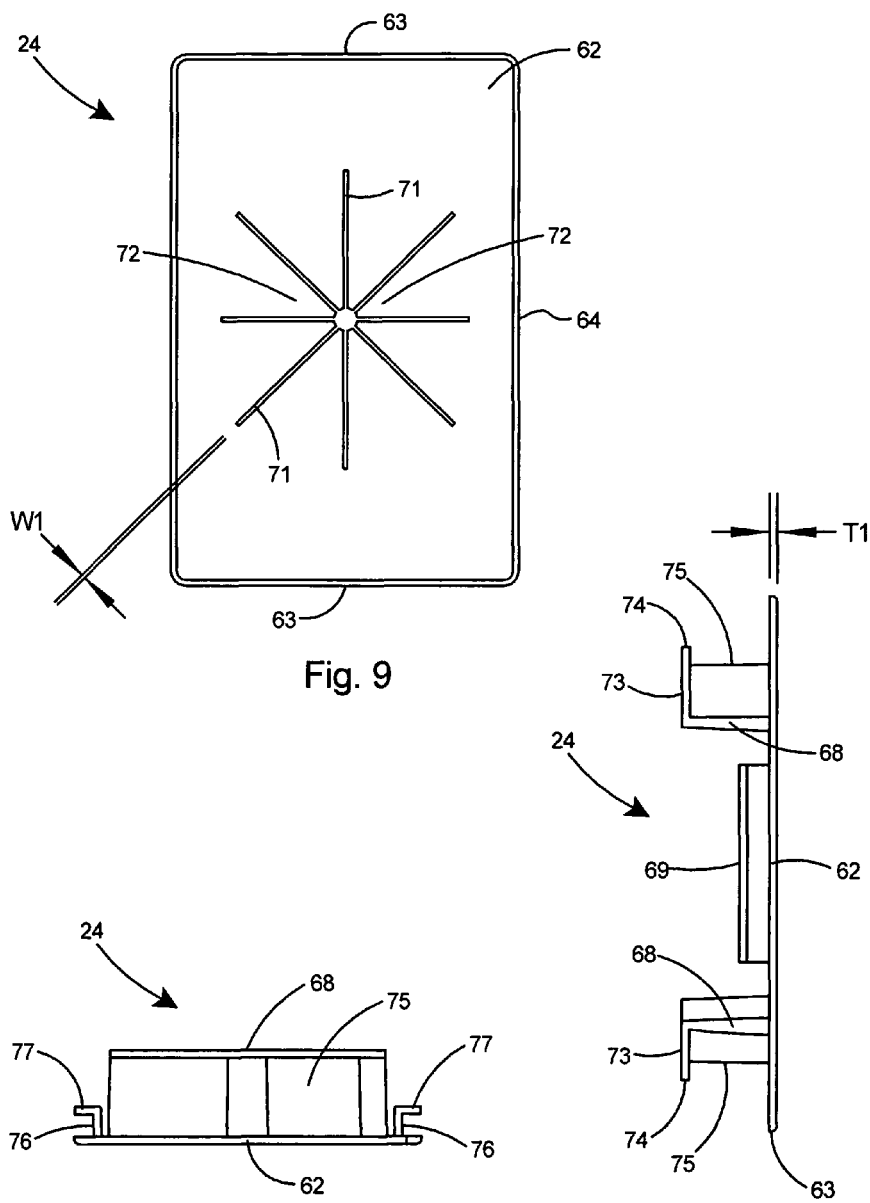

RAPID MOUNT ELECTRICAL CABLE ENTRY DEVICE WITH FLEXIBLE SLOTTED INSERT

This application is a Continuation-In-Part of U.S. patent application Ser. No. 13/066,893, filed on Apr. 27, 2011 now U.S. Pat. No. 8,314,350 entitled "Electrical Cable Entry Device with Flexible Slotted Insert" and is a Continuation-In-Part of U.S. patent application Ser. No. 12/319,648, filed on Jan. 9, 2009 entitled "Electrical Mounting Device with Front Plate and Retractable Clamp Arms for Rapid Mounting using Hole Saw", now U.S. Pat. No. 8,063,302, of which the entire contents of said applications application and patent are incorporated herein in its entirety their entireties by reference thereto.

FIELD OF THE INVENTION

This invention relates to the installation of low voltage wiring in buildings and specifically to a rapid mount electrical cable entry device with flexible slotted insert for routing low voltage electrical or communications cables through interior walls.

BACKGROUND OF THE INVENTION

A wide variety of low voltage components such as telephone cables, coax cables for television and interne service, wiring for home entertainment systems and surround sound, and cables for connecting computers to peripherals such as printers and facsimile machines, are prevalent in today's homes and offices. Frequently it is necessary to route these low voltage wires and cables through interior walls in order to connect low voltage components in separate rooms.

One disadvantage with prior art cable entry devices or cable ports is the substantial amount of time required for installation as a square hole must be cut in the wall in order to accommodate the cable port. A further disadvantage with prior art cable entry devices is that they typically include a cable shield that projects outward from the wall. There are many situations in which a homeowner would desire a cable entry installation in which a cable shield or nose portion does not extend outwards, such as when it is desired to place a low voltage device, appliance, or furniture in close proximity to the cable entry device. In such a situation, it would be desirable to install a cable entry device that does not project outward from the wall but at the same time obscures the cable entryway from view.

What is needed therefore is a cable entry device that can be rapidly mounted to a wall or similar surface for the purpose of providing a port for routing low voltage cables there through. The cable entry device should include a low profile so that it does not extend substantially from the wall after being attached thereto.

SUMMARY OF THE INVENTION

The invention is a rapid mount electrical cable entry device with a flexible slotted insert for routing low voltage cables through walls. The cable entry device includes a rigid low voltage frame with a plate having an opening therein, a rearward extending sidewall surrounding the opening, and a flexible insert within the opening. The flexible insert is removable to provide access to mounting fasteners on the inner periphery of the plate opening. All that is required for preparing the wall for installation of the cable entry device is a simple circular hole, which can be rapidly made in the sheet rock by a simple hole saw. To secure the low voltage frame to the wall, mounting fasteners with attached clamp arms on the low voltage frame are passed through the hole in the wall and are rotated to draw the clamp arms toward the plate. After the low voltage frame is secured to the wall, the flexible insert is reinserted within the plate opening and thus provides a flexible panel extending across the opening of the plate. The flexible panel includes a hole therein and a plurality of open slots extending radially from the hole. The open slots enable the cable entry device to accommodate passage of low voltage cables there through for the purpose of providing a portal for routing the cables through a wall. The open slots define flaps that close around the cables after they are inserted therein, thus closing the area around the periphery of the inserted cables.

OBJECTS AND ADVANTAGES

Several advantages are achieved with the cable entry device of the present invention, including:
(1) The cable entry device provides a portal for routing low voltage wires and cables through walls.
(2) The cable entry device can be secured to a wall in less than a minute as wall preparation requires only a standard size hole saw.
(3) The cable entry device can accommodate ¼-inch to 1.5-inch wall thicknesses.
(4) With the mounting fasteners tightened, the mounting clamps hold the cable entry device securely against drywall.
(5) The cable entry device is easily leveled, even after it is installed, by simply rotating as needed and then tightening the mounting fasteners.
(6) The slotted design prevents cables from slipping backwards out of the wall.
(7) The slotted entry panel is flexible to protect low voltage cables against abrasion.
(8) The cable entry device can be used to provide an aesthetically pleasing cable entry port on any wall.

These and other objects and advantages of the present invention will be better understood by reading the following description along with reference to the drawings.

DESCRIPTION OF THE DRAWINGS

FIG. 9 is a front elevation view of the flexible slotted insert.

FIG. 10 is an end view of the flexible insert.

FIG. 11 is a side view of the flexible insert.

INDEX TO REFERENCE NUMERALS IN DRAWINGS

| | |
|---|---|
| 20 | electrical cable entry device with flexible slotted insert |
| 22 | low voltage frame |
| 24 | flexible insert |
| 25 | plate |
| 26 | opening |
| 28 | inner periphery |
| 30 | mounting boss |
| 31 | face of mounting boss |
| 32 | oversize aperture |
| 33 | front surface of plate |
| 34 | mounting fastener |
| 35 | end of mounting fastener |
| 36 | clamp arm |
| 38 | fastener head |
| 40 | retracted position of clamp arm |
| 41 | mounting arrangement |
| 42 | component boss |
| 44 | aperture |
| 46 | rear surface of plate |
| 47 | plate portion |
| 48 | sidewall |
| 49 | plate edge |
| 50 | L-shaped post |
| 52 | frame body |
| 54 | extended position of clamp arm |
| 55 | base portion of clamp arm |
| 56 | stem portion of clamp arm |
| 57 | first edge |
| 58 | tab |
| 59 | bore through base portion of clamp arm |
| 60 | directional arrow |
| 61 | second edge |
| 62 | flexible panel |
| 63 | end of panel |
| 64 | side of panel |
| 65 | front surface of panel |
| 66 | rear surface of panel |
| 67 | fastening arrangement |
| 68 | arcuate-shaped sidewall connector |
| 69 | plate connector |
| 70 | hole in panel |
| 71 | open slot |
| 72 | flap |
| 73 | terminal end of sidewall connector |
| 74 | rim |
| 75 | sidewall seat |
| 76 | base portion of plate connector |
| 77 | tab |
| 80 | wall |
| 82 | hole in wall |
| 84 | drywall |
| $\Theta 1$ | total angle of rotation of the clamp from retracted to extended |
| D1 | diameter of outer periphery of circular sidewall |
| D2 | diameter at first edge of post |
| T1 | thickness of panel |
| W1 | width of slot |

DETAILED DESCRIPTION OF THE INVENTION

Figure 1:
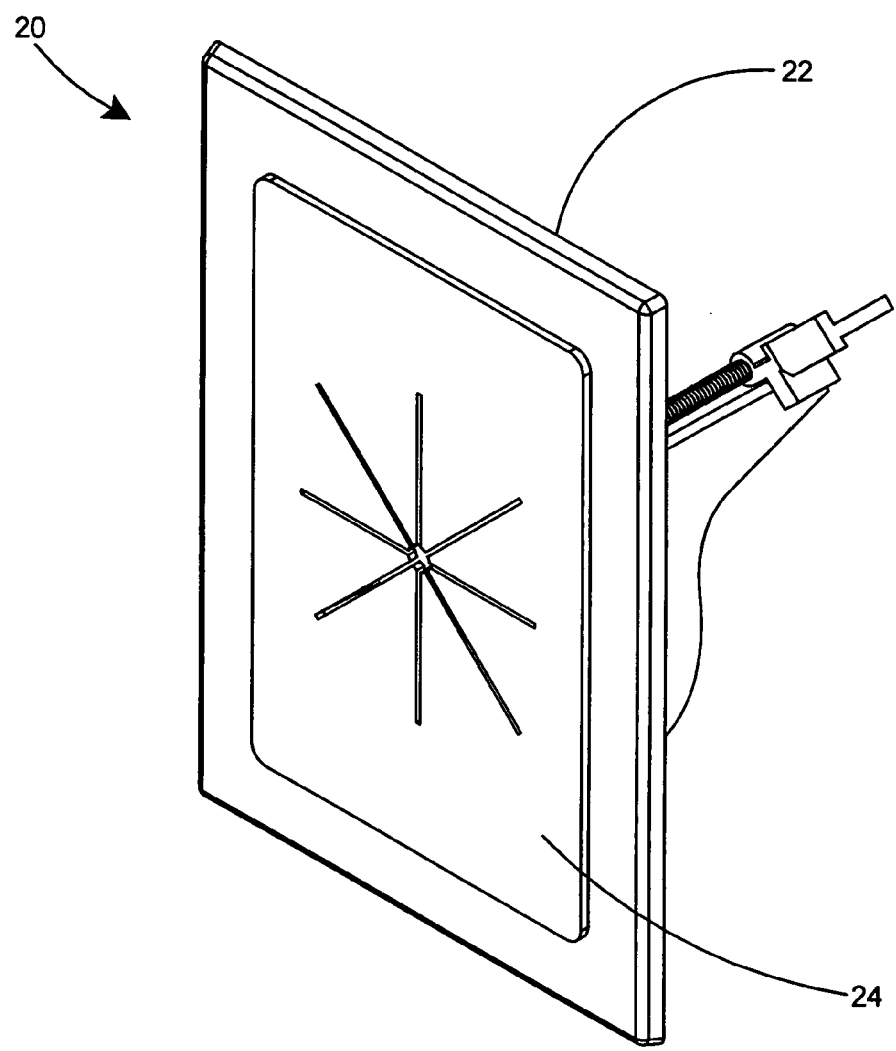
FIG. 1 is a perspective view of the preferred embodiment of an electrical cable entry device according to the present invention.

Referring to FIG. 1 there is shown a preferred embodiment of the present invention, an electrical cable entry device 20 with a low voltage frame 22 and a flexible slotted insert 24.

Figure 2:
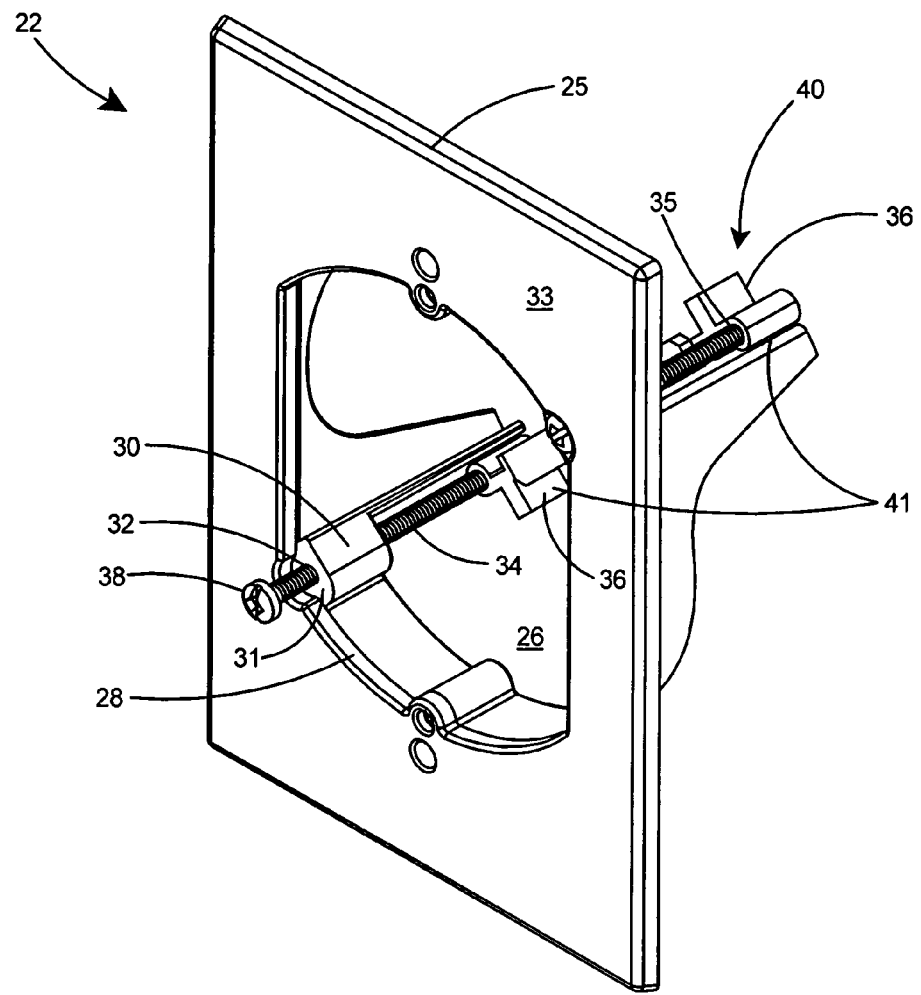
FIG. 2 is a front perspective view of a low voltage bracket that forms a portion of the cable entry device of FIG. 1.

With reference to FIG. 2, the low voltage frame 22 includes a plate 25 having an opening 26 therein and an inner periphery 28 on the plate 25 surrounding the opening. Two mounting bosses 30, integral with the plate 25, are provided along the inner periphery 28. The mounting bosses 30 include a face 31 and oversize apertures 32 therein. The plate 25 includes a front surface 33 and the face 31 of the mounting bosses 30 are recessed away from the front surface of the plate 25. Substantially long mounting fasteners 34 include ends 35 that extend through the oversize apertures 32 in the mounting bosses 30 and each mounting fastener 34 includes a clamp arm 36 secured rigidly to the end 35 of the fastener 34. Thus each mounting fastener 34 can be easily rotated within its oversize aperture 32 as desired by turning the head 38 of the respective fastener 34 with an appropriate tool such as a screwdriver (not shown). Each clamp arm 36 can therefore be rotated between an extended position and retracted position 40 as desired. FIG. 2 depicts the clamp arms 36 in the retracted position 40. The mounting fasteners 34, mounting bosses 30, and clamp arms 36 form a mounting arrangement 41 for securing the low voltage frame 22 to a wall (not shown).

Figure 3:
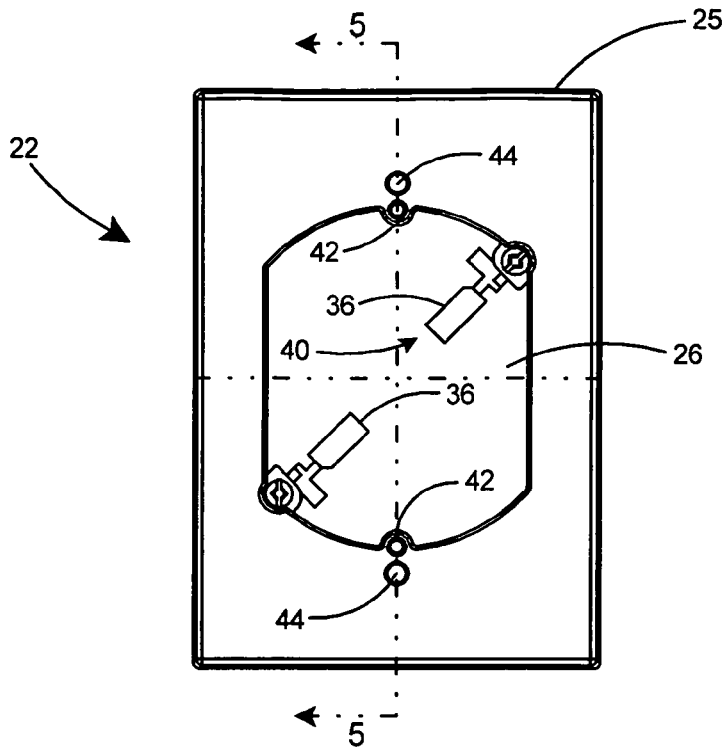
FIG. 3 is a front view of the low voltage frame of FIG. 2, with the clamp arms rotated to a retracted position.
Figure 4:
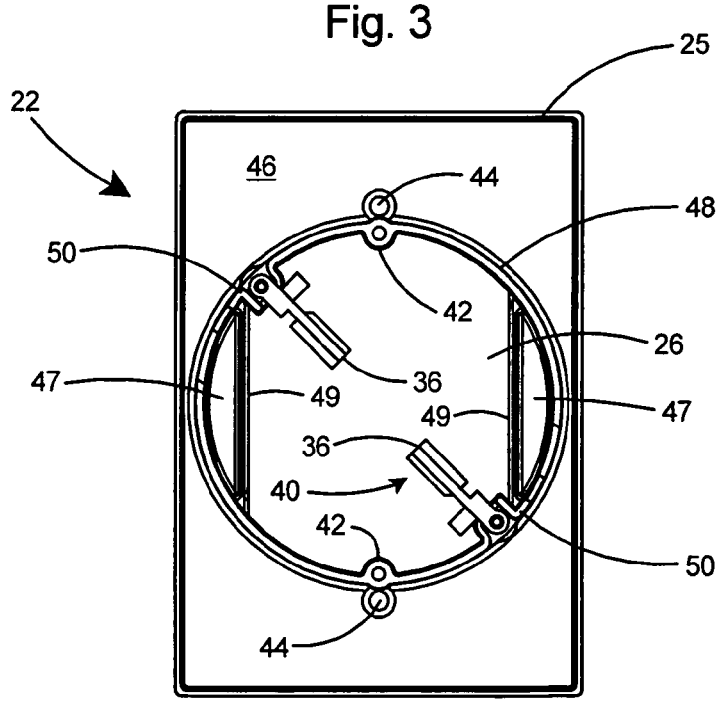
FIG. 4 is a rear view of the low voltage frame.

With reference to FIGS. 3 and 4, which depict the clamp arms 36 in the retracted position 40, the low voltage frame 22 further includes component bosses 42 along the inner periphery 28 of the opening 26 and apertures 44 for the connection of electrical fixtures (not shown). As shown in FIG. 3, the rear surface 46 of the plate 25 includes a circular sidewall 48 extending rearward from the plate. Two L-shaped posts 50 extend rearward from the sidewall 48 immediately adjacent to each mounting boss 30. As shown in FIG. 3, with the clamp arms 36 rotated to their retracted position 40, the clamp arms 36 are confined completely within the perimeter of the sidewall 48. Low voltage frame 22 further includes two plate portions 47 extending inward of the circular sidewall 48. The plate portions 47 define straight plate edges 49 that form a portion of the plate opening 26. The mounting bosses 30 are integral with the plate 25 and also integral with the sidewall 48.

Figure 6:
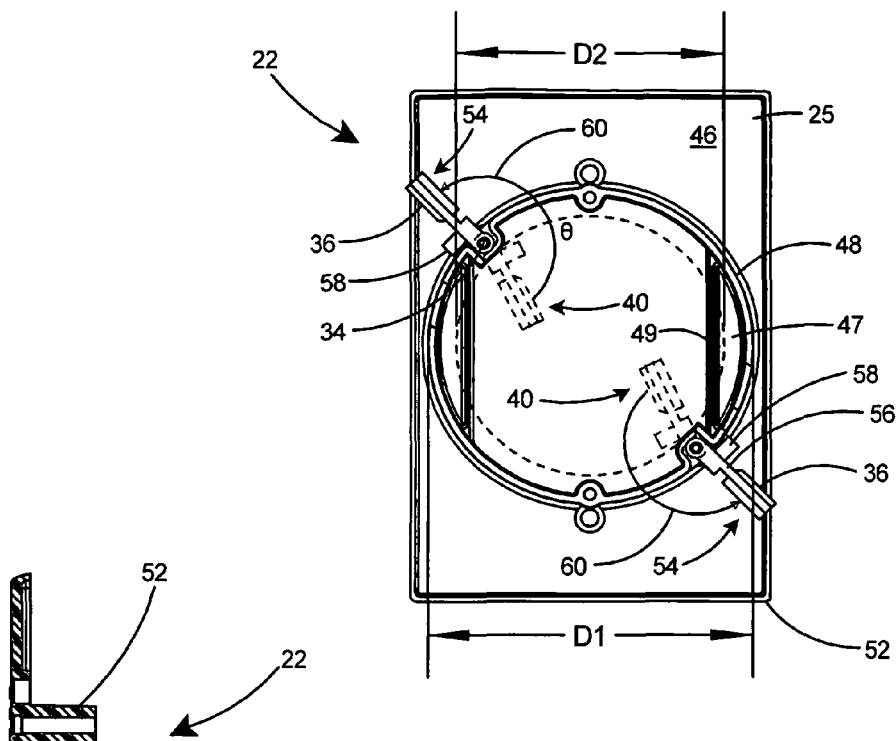
FIG. 6 is a sectional view of the low voltage frame taken along line 6-6 of FIG. 5.
Figure 5:
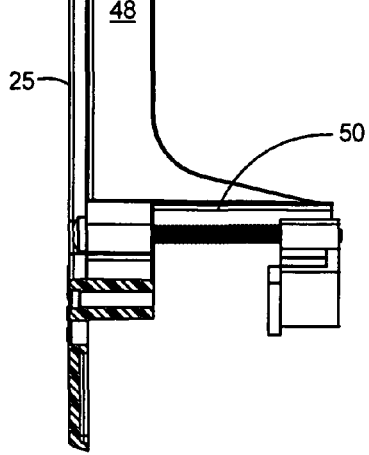
FIG. 5 is a sectional view of the low voltage frame taken along line 5-5 of FIG. 3.
Figure 6A:
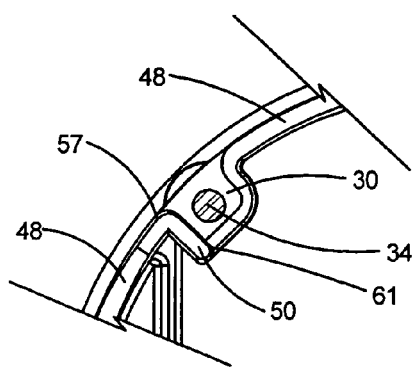
FIG. 6A is a detail view of a portion of the circular peripheral wall and L-shaped post on the rear side of the low voltage frame of FIG. 6.

Referring to FIGS. 5-6A, the two L-shaped posts 50 extend from the sidewall 48. As shown in FIG. 5, the plate 25, sidewall 48, and posts 50 together form a low voltage frame body 52. The frame body 52 is typically molded in one-piece of plastic. As shown in FIG. 6, the clamp arms 36 can be rotated from the retracted position 40 to an extended position 54, or vice versa, by turning mounting fastener 34. Each clamp arm 36 includes a base portion 55, a stem portion 56 and an outward extending tab 58. Base portion 55 of clamp arm 36 includes a bore 59 therein through which the mounting fastener will extend. As the clamp arm is rotated fully in the direction of arrow 60 in FIG. 5, the tab 58 engages the L-shaped post 50 and stops the travel of the clamp arm 36 thereby positioning the clamp arm 36 in the extended position 54. If the clamp arm 36 is rotated fully in the direction opposite of arrow 60, the stem 56 of the clamp arm 36 engages a first edge 57 on L-shaped post 50 thereby positioning the clamp arm 36 in the retracted position 40. Circular sidewall 48 of low voltage frame 22 includes an outer periphery or outer diameter D1. As shown in FIG. 6, the first edge 57 is at a second diameter D2, which is a smaller diameter than the outer periphery D1 of the sidewall 48, and first edge 57 positions the clamp arms 36 in the retracted position 40 thereby retracting all portions of the clamp arms 36 within the outer periphery D1 of the sidewall 48. The total angle of rotation $\Theta 1$ of the clamp arm 36 from the retracted position 40 to the extended position 54 is 198°. The two clamp arms 36 are situated at 180° apart on opposite sides of the sidewall 48. As viewed from the front side of the plate 25, rotation of the clamp arms 36 fully counterclockwise will position the clamp arms 36 in the retracted position 40 and rotation of the clamp arms 36 fully clockwise will position the clamp arms 36 in the extended position 54. As shown in FIG. 6A, the L-shaped post 50 is located along the sidewall 48 immediately adjacent to the mounting boss 30 through which the mounting fastener 34 extends. A second edge 61 is provided on each L-shaped post 50 to stop the rotation of the clamp arm 36 when it is fully turned clockwise to the extended position 54 and thus properly position the clamp arm 36 behind the sheetrock.

Figure 7:
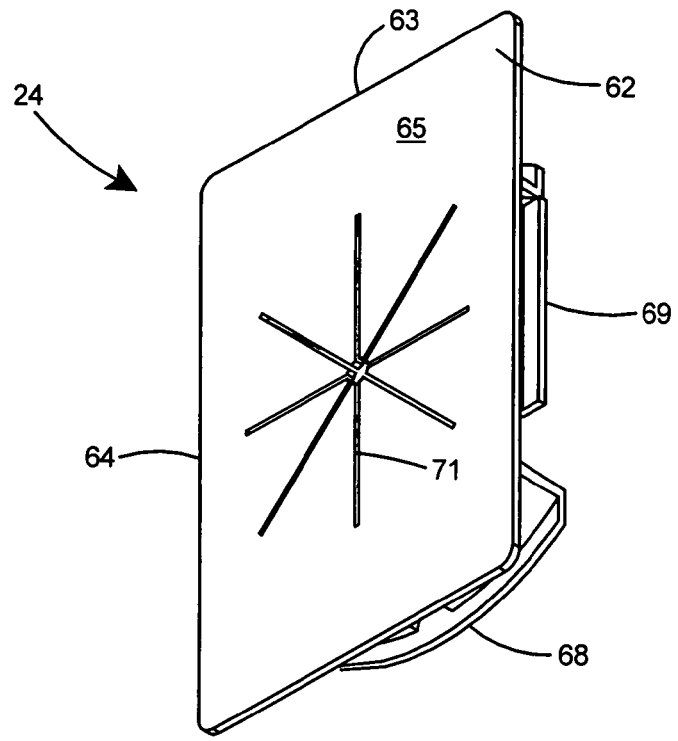
FIG. 7 is a front perspective view of a flexible slotted insert that forms a portion of the cable entry device of FIG. 1.
Figure 8:
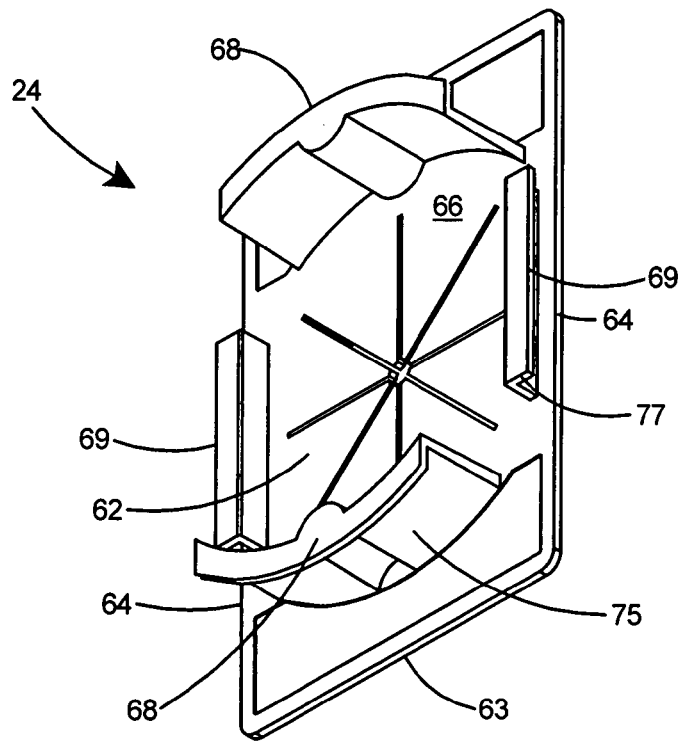
FIG. 8 is a rear perspective view of the flexible slotted insert.

With reference to FIGS. 7 and 8, the flexible slotted insert 24 includes a flexible panel 62 having two ends 63, two sides 64, a front surface 65, and a rear surface 66 with a fastening arrangement 67 thereon for securing the flexible insert 24 to the low voltage frame (see FIG. 2). The fastening arrangement 67 includes integral arcuate-shaped sidewall connectors 68 extending from the rear surface 66 of the flexible panel 62 near each end 63 of the panel and plate connectors 69 extending from the rear surface 66 of the flexible panel 62 near each side 64 of the panel.

Referring to FIGS. 9-11, the flexible panel 62 includes a hole 70 in the center and eight open slots 71 extending radially outward from the hole 70 thereby defining a plurality of flaps 72 in the flexible panel 62. As shown in FIG. 9, when cables are later inserted through the flexible slotted insert 24, it is important that the flaps 72 open freely upon insertion of cables through the panel 62 and therefore the open slots 71 preferably include a width W1 of at least 0.062 inch. It is important that the open slots 71 are open areas and not just slits in the flexible panel 62. As shown in FIG. 11, the thickness T1 of the panel 62 is preferably at least 0.062 inch.

As shown in FIG. 11, the integral arcuate-shaped sidewall connectors 68 include terminal ends 73 and rims 74 extending from the terminal ends 73. A sidewall seat 75 is created by the portion of the sidewall connectors 68 between the panel 62 and the rim 74. The sidewall connectors 68 of the flexible insert 24 are adapted to engage the sidewall 48 (see FIG. 4) of the low voltage frame 22 when the flexible insert 24 and low voltage frame 22 are secured together. As shown in FIG. 10, the plate connectors 69 include a base portion 76 extending from the panel 62 and integral tabs 77 extending orthogonally from the base portion 76. The plate connectors 69 are adapted to engage the plate portions 47 (see FIG. 4) of the low voltage frame 22 when the flexible insert 24 and low voltage frame 22 are secured together.

Figure 12:
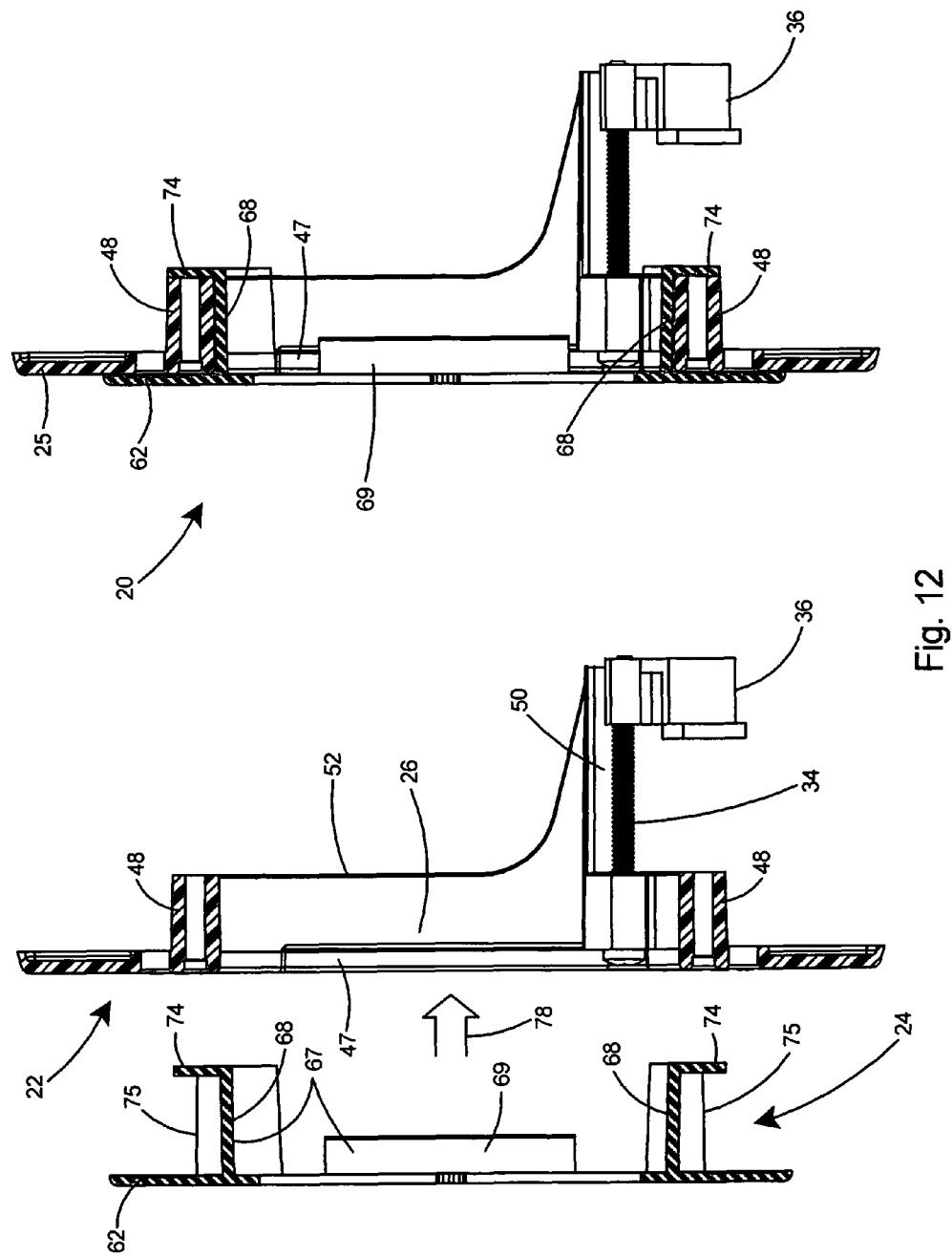
FIG. 12 is a conceptual view depicting the insertion of the flexible insert into the low voltage frame to form the cable entry device of the present invention.

With reference to FIG. 12 there is shown on the left side of the figure a flexible insert 24 according to the invention in alignment with a low voltage frame 22. The frame body 52 is preferably molded in one piece of plastic. The flexible insert 24 is molded in one piece of an elastomeric material, preferably a synthetic rubber. Thus the various portions of the fastening arrangement 67, including the sidewall connector 68 and the plate connector 69 are flexible and capable of deforming as the insert 24 is pressed within the opening 26 of the low voltage frame 22. The flexible insert 24 is secured to the low voltage frame 22 by slightly compressing the insert 24 and sliding it in the direction of arrow 78 until fastening arrangement 67 of the insert 24 engages the low voltage frame 22. As shown on the right side of FIG. 12, the flexible insert 24 secured to the low voltage frame 22 forms the electrical cable entry device 20 of the present invention. The flexible insert 24 is secured to the low voltage frame 22 by the rims 74 of sidewall connector 68 engaging the sidewall of the low voltage frame 22 and by the tabs 77 of plate connectors 69 of flexible insert 24 engaging the plate portion of the low voltage frame 22. The electrical cable entry device 20 is typically provided as an assembly, such as shown on the right side of FIG. 12; with the flexible insert 24 secured to the low voltage frame 22 by the fastening arrangement 67.

Figure 13:
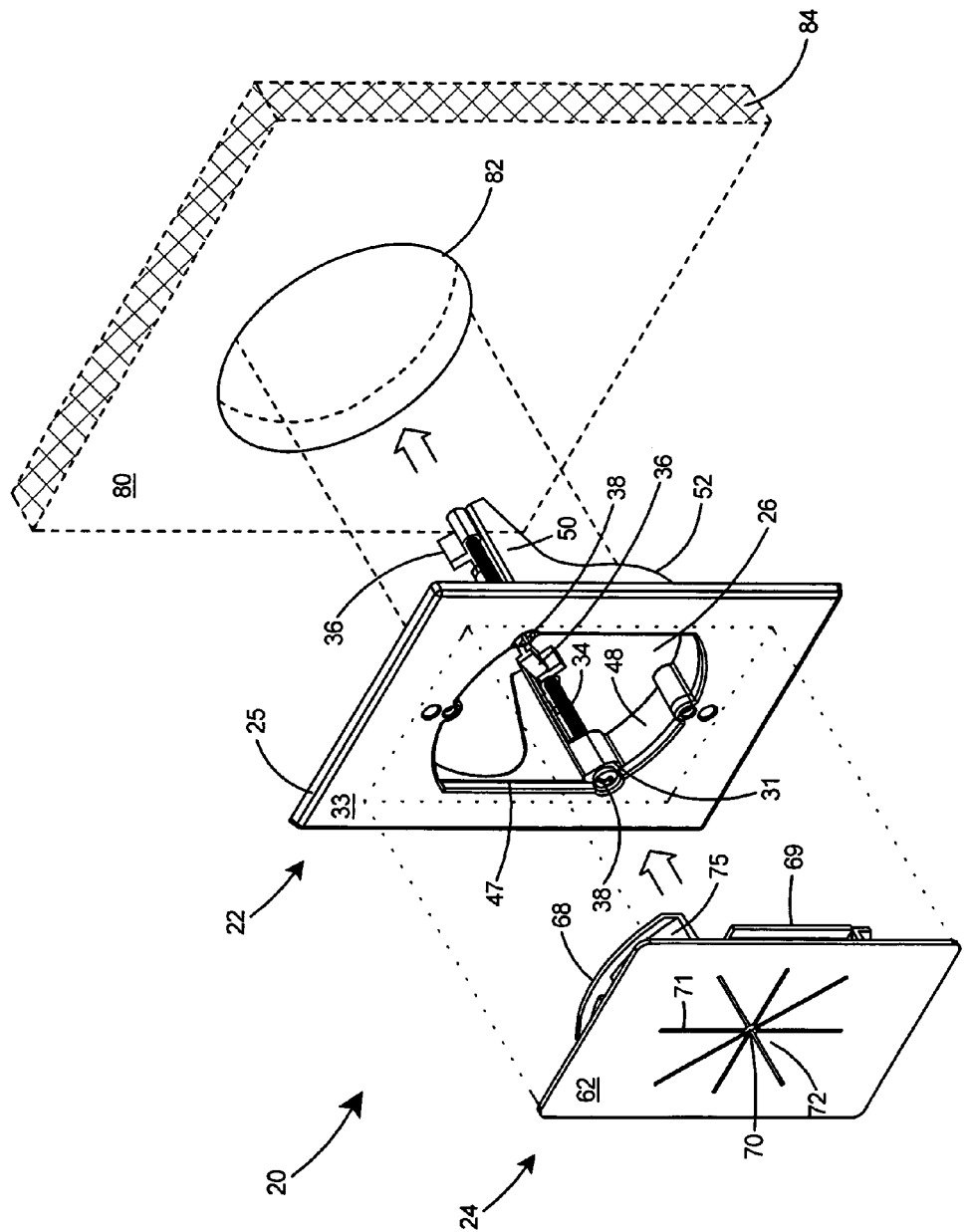
FIG. 13 is a perspective view of the cable entry device in alignment with a hole in a wall to be mounted thereto.

The reader is referred to FIG. 13 for an illustration of the operation of the electrical cable entry device 20. For installation on a wall 80, the flexible insert 24 is first removed from the low voltage frame 22 to expose the heads 38 of the mounting fasteners 34. A round hole 82 is formed in the drywall 84 comprising the wall 80. The plate 25 and circular sidewall 48 are sized such the hole 82 can be formed with a standard sized hole saw (not shown), such as a 3.5-inch, 4.0-inch, 4.5-inch, or similar standard size hole saw. Hole saws are attachable to conventional drills or similar tools and are readily available to electrical technicians or to the homeowner. The installer simply forms the hole 82, rotates the clamp arms 36 fully counterclockwise, and then inserts the low voltage frame 22 until plate 25 is flush against the wall 80. In the fully counterclockwise position the clamp arms 36 are within the outer periphery of the sidewall 48 enabling sliding of low voltage frame 22 into the hole 82 until the plate 25 is flush against the wall 80. The low voltage frame 22 is secured to the wall 80 by engaging heads 38 of mounting fasteners 34 and rotating them clockwise until the clamp arms 36 are firmly clamped against the back surface of wall 80. Flexible slotted insert 24 is then simply pressed into the opening 26 where it is held therein by the fastening arrangement including arcuate-shaped sidewall connectors 68 of insert 24 engaging sidewall 48 of low voltage frame 22 and plate connectors 69 of insert 24 engaging plate portions 47 of low voltage frame 22. Recessing the face 31 of each mounting boss 30 away from the front surface 33 of the plate 25 will insure that flexible panel 62 portion of the flexible insert 24 will fit flush against the plate 25 when the flexible panel 62 is secured to the low voltage frame 22. It provides space for the heads 38 of mounting fasteners 34 so that they don't extend beyond the front surface 33 of plate 25 and interfere with the flush fit of panel 62 against plate 25.

After the low voltage frame 22 is secured to the wall 80 and the flexible insert 24 is secured to the low voltage frame 22, the installer simply inserts the ends of electrical cables (not shown) through the flaps 72 of the flexible insert 24. The flaps 72 of flexible panel 62, being constructed of an elastomeric material, will simply flex to allow insertion of cables. The flaps 72 will then return to their unbiased position and block the view into the opening 26 of the low voltage frame 22. Additional cables can be inserted later by following the same procedure.

The frame body 52 (see FIG. 5) of the low voltage frame 22, which includes the plate 25, sidewall 48, and L-shaped posts 50, is preferably molded in one piece of plastic. This enables production of the low voltage frame 22 of the present invention in high speed molding equipment at low unit cost. The cable entry device may be molded of various plastics including polycarbonate, polyvinyl chloride, acrylonitrile-butadiene styrene, and polyethylene.

The flexible insert 24 is preferably molded of an elastomeric material such as synthetic rubber. Most preferably, the flexible insert is formed of SANTOPRENE®, a synthetic rubber elastomeric material available from Monsanto Company Corporation of St. Louis, Mo. Most preferably, the elastomeric flexible insert 24 includes a Shore A hardness of between 60 and 80. A hardness value in this range insures that the flexible insert 24 will include the proper flexural characteristics to enable it to deform while being inserted within the opening (see FIG. 12) of the low voltage frame 22 while also providing the proper stiffness to enable the sidewall connectors 68 and plate connectors 69 to engage and hold respectively the sidewall 48 and plate portions 47 of the low voltage frame 22.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A cable entry device for routing cables through a wall, comprising:
   a low voltage frame including a frame body having two ends, two sides, a plate with a rear surface and an opening therein, and a sidewall extending rearward from said rear surface of said plate;
   a mounting arrangement for securing said low voltage frame to a wall;
   a flexible insert within said opening of said plate;
   a flexible panel on said flexible insert, said flexible panel extending across said opening of said plate, said flexible panel including a rear surface;
   a fastening arrangement for securing said flexible insert to said low voltage frame, said fastening arrangement including sidewall connectors extending from said rear surface of said flexible panel, said sidewall connectors of said flexible insert being adapted to engage said sidewall of said low voltage frame; and
   a plurality of open slots in said flexible panel.

2. The cable entry device of claim 1 wherein said mounting arrangement includes:
   a mounting boss integral with said plate of said low voltage frame; and
   an oversize aperture in said mounting boss.

3. The cable entry device of claim 2 wherein said mounting arrangement includes:
   a mounting fastener extending through said oversize aperture in said mounting boss, said mounting fastener including a head and an end; and
   a clamp arm rigidly secured to said end of said mounting fastener.

4. The cable entry device of claim 3 including:
   a plurality of said mounting fasteners on said low voltage frame;
   an inner periphery on said plate, said inner periphery surrounding the opening of said low voltage frame; and
   said mounting fasteners being at said inner periphery of said low voltage frame.

5. The cable entry device of claim 4 wherein:
   said low voltage frame includes two of said clamp arms; and
   said clamp arms are situated 180° apart on opposite sides of said sidewall.

6. The cable entry device of claim 2 wherein said low voltage frame includes:
   two of said mounting bosses; and
   two posts extending rearward from said sidewall immediately adjacent to each of said mounting bosses.

7. The cable entry device of claim 2 wherein:
   said plate includes a front surface;
   said mounting boss includes a face; and
   said face of said mounting boss is recessed away from said front surface of said plate.

8. The cable entry device of claim 1 wherein:
   said flexible panel includes a hole therein; and
   said open slots extend radially from said hole.

9. The cable entry device of claim 8 wherein said plurality of open slots extending radially from said hole define a plurality of flaps on said flexible panel.

10. The cable entry device of claim 9 wherein said flexible panel of said flexible insert includes eight of said slots and eight of said flaps.

11. The cable entry device of claim 1 wherein said fastening arrangement includes:
    a plate connector on said flexible insert; and
    a plate portion on said low voltage frame, said plate portion extending inward of said sidewall.

12. The cable entry device of claim 11 wherein said fastening arrangement includes:
    a rim on said sidewall connector; and
    a tab on said plate connector.

13. The cable entry device of claim 1 wherein each of said open slots has a width of at least 0.062 inch.

14. The cable entry device of claim 1 wherein said flexible insert is constructed of an elastomeric material.

15. The cable entry device of claim 14 wherein:
    said flexible insert is molded in one piece of synthetic rubber; and
    said flexible insert includes a Shore A hardness of between 60 and 80.

16. The cable entry device of claim 1 wherein said frame body is molded in one piece of plastic.

17. The cable entry device of claim 16 wherein said plastic is selected from the group consisting of polycarbonate, polyvinyl chloride, acrylonitrile-butadiene styrene, and polyethylene.

* * * * *

(12) EX PARTE REEXAMINATION CERTIFICATE (29th)
Ex Parte Reexamination Ordered under 35 U.S.C. 257

United States Patent
Gretz

(10) Number: US 8,357,853 C1
(45) Certificate Issued: May 8, 2015

(54) RAPID MOUNT ELECTRICAL CABLE ENTRY DEVICE WITH FLEXIBLE SLOTTED INSERT

(75) Inventor: Thomas J. Gretz, Port St. Lucie, FL (US)

(73) Assignee: ARLINGTON INDUSTRIES, INC., Scranton, PA (US)

Supplemental Examination Request:
No. 96/030,011, Aug. 19, 2014

Reexamination Certificate for:
Patent No.: 8,357,853
Issued: Jan. 22, 2013
Appl. No.: 13/068,343
Filed: May 9, 2011

Related U.S. Application Data

(63) Continuation-in-part of application No. 13/066,893, filed on Apr. 27, 2011, now Pat. No. 8,314,350, and a continuation-in-part of application No. 12/319,648, filed on Jan. 9, 2009, now Pat. No. 8,063,302.

(51) Int. Cl.
*H02G 3/10* (2006.01)
*H02G 3/14* (2006.01)
*H02G 3/12* (2006.01)

(52) U.S. Cl.
CPC ............. *H02G 3/14* (2013.01); *Y10T 29/53243* (2015.01); *H02G 3/123* (2013.01)

(58) Field of Classification Search
None
See application file for complete search history.

(56) References Cited

To view the complete listing of prior art documents cited during the supplemental examination proceeding and the resulting reexamination proceeding for Control Number 96/030,011, please refer to the USPTO's public Patent Application Information Retrieval (PAIR) system under the Display References tab.

*Primary Examiner* — Majid A Banankhah

(57) ABSTRACT

A rapid mount electrical cable entry device including a rigid low voltage frame and a flexible slotted insert for routing low voltage cables through walls. The low voltage frame includes a plate with an opening therein defining an inner periphery on the plate at the opening. The low voltage frame includes mounting fasteners with attached clamp arms for securing the frame to a wall. The slotted insert includes a flexible panel with a hole therein and a plurality of open slots extending radially from the hole. The slots enable the cable entry device to accommodate passage of low voltage cables there. The slots define flaps that close around the cables after they are inserted therein, thus closing the area around the periphery of the inserted cables. Wall preparation requires only a hole saw, which minimizes installation time.

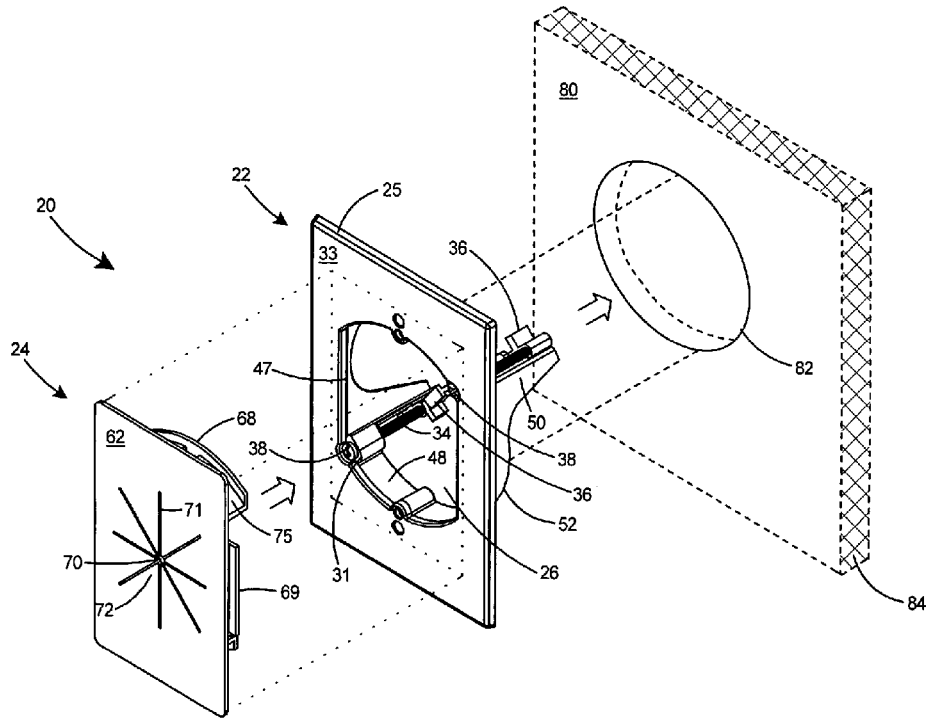

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 11 and 12 is confirmed.
Claims 1, 6 and 7 are cancelled.
Claims 2-5, 8-10 and 13-17 were not reexamined.

* * * * *